US012415372B2

(12) United States Patent
Iwamoto

(10) Patent No.: US 12,415,372 B2
(45) Date of Patent: Sep. 16, 2025

(54) PRINTER HAVING SENSOR TO DETECT REMAINING WOUND AMOUNT OF LABEL PAPER

(71) Applicant: Toshiba Tec Kabushiki Kaisha, Tokyo (JP)

(72) Inventor: Satoshi Iwamoto, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 197 days.

(21) Appl. No.: 18/326,820

(22) Filed: May 31, 2023

(65) Prior Publication Data

US 2024/0140111 A1 May 2, 2024

(30) Foreign Application Priority Data

Nov. 2, 2022 (JP) ................................ 2022-176302

(51) Int. Cl.

| | |
|---|---|
| ***B41J 11/00*** | (2006.01) |
| ***B41J 3/407*** | (2006.01) |
| ***B41J 3/46*** | (2006.01) |
| ***B41J 15/04*** | (2006.01) |
| *B41J 3/01* | (2006.01) |
| *B41J 29/38* | (2006.01) |

(52) U.S. Cl.

CPC ......... *B41J 11/0095* (2013.01); *B41J 3/4075* (2013.01); *B41J 3/46* (2013.01); *B41J 11/0075* (2013.01); *B41J 15/04* (2013.01); *B41J 3/01* (2013.01); *B41J 29/38* (2013.01)

(58) Field of Classification Search

CPC ...... B41J 11/0095; B41J 3/46; B41J 11/0075; B41J 3/4075; B41J 3/01; B41J 15/04; B41J 29/38

See application file for complete search history.

(56) References Cited

U.S. PATENT DOCUMENTS

| | | | | |
|---|---|---|---|---|
| 2012/0057200 | A1 | 3/2012 | Yamamoto | |
| 2016/0350624 | A1 | 12/2016 | Liguori et al. | |
| 2019/0287431 | A1 * | 9/2019 | Yamada | B41J 11/0075 |
| 2019/0291481 | A1 | 9/2019 | Yazawa et al. | |
| 2019/0358950 | A1 | 11/2019 | Sugimoto | |

FOREIGN PATENT DOCUMENTS

EP 4088938 A1 11/2022

OTHER PUBLICATIONS

Extended European Search Report dated Nov. 23, 2023, mailed in corresponding European Application No. 23193403.5, 9 pages.

* cited by examiner

*Primary Examiner* — Henok D Legesse

(74) *Attorney, Agent, or Firm* — Kim & Stewart LLP

(57) ABSTRACT

In accordance with an embodiment, a printer prints on labels attached to rolled paper at predetermined intervals. The printer includes a sensor that outputs a detection signal where a diameter of the rolled paper is a predetermined value or less. The printer detects, on the basis of the detection signal output from the sensor, a near-end state during an issuing operation of one label. Further, the printer determines, where the near-end state has been detected continuously for a predetermined number or more of labels, that a remaining amount of the rolled paper has been a predetermined amount.

9 Claims, 10 Drawing Sheets

203

| Label pitch range | Predetermined number of times |
|---|---|
| $P \leqq 50\text{mm}$ | 6 |
| $50\text{mm} < P \leqq 100\text{mm}$ | 4 |
| $100\text{mm} < P$ | 2 |

Fig.6

204

| Label pitch | Number of steps for one label |
|---|---|
| A | a |
| B | b |
| ... | ... |
| N | n |

Fig.7

PRINTER HAVING SENSOR TO DETECT REMAINING WOUND AMOUNT OF LABEL PAPER

CROSS-REFERENCE TO RELATED APPLICATIONS

This application is based upon and claims the benefit of priority from the prior Japanese Patent Application No. 2022-176302, filed on Nov. 2, 2022, the entire contents of which are incorporated herein by reference.

FIELD

An embodiment to be described here generally relates to a printer.

BACKGROUND

In the past, a printer that prints on rolled paper wound in a roll has been known. For example, a printer that prints on labels of rolled paper to which the labels are attached at predetermined intervals has been known. In this type of printer, the fact that the remaining amount of rolled paper is low is detected (hereinafter, referred to also as "remaining amount detection") and a user is notified of the fact.

The remaining amount detection of rolled paper is performed using a sensor disposed to face a side surface of the rolled paper. Specifically, the sensor detects that the position of the outer peripheral surface of the rolled paper in the radial direction is a predetermined position. As a result, the printer detects that the winding amount of the rolled paper has decreased, i.e., the remaining amount of the rolled paper has been low.

A printer that accurately performs remaining amount detection of rolled paper by holding down the rolled paper so as not to move in the radial direction during a printing operation of the printer has been proposed. However, this printer needs to have a structure for holding down the rotating rolled paper, and thus, the structure of the printer is complicated. For this reason, it is desired to be able to perform remaining amount detection of rolled paper with a simple structure.

BRIEF DESCRIPTION OF THE DRAWINGS

FIG. 6 is a diagram showing a data configuration of a predetermined-number-of-times management table stored in a storage device of the label printer according to the embodiment.

FIG. 7 is a diagram showing a data configuration of a number-of-steps management table stored in the storage device of the label printer according to the embodiment.

DETAILED DESCRIPTION

Figure 1:
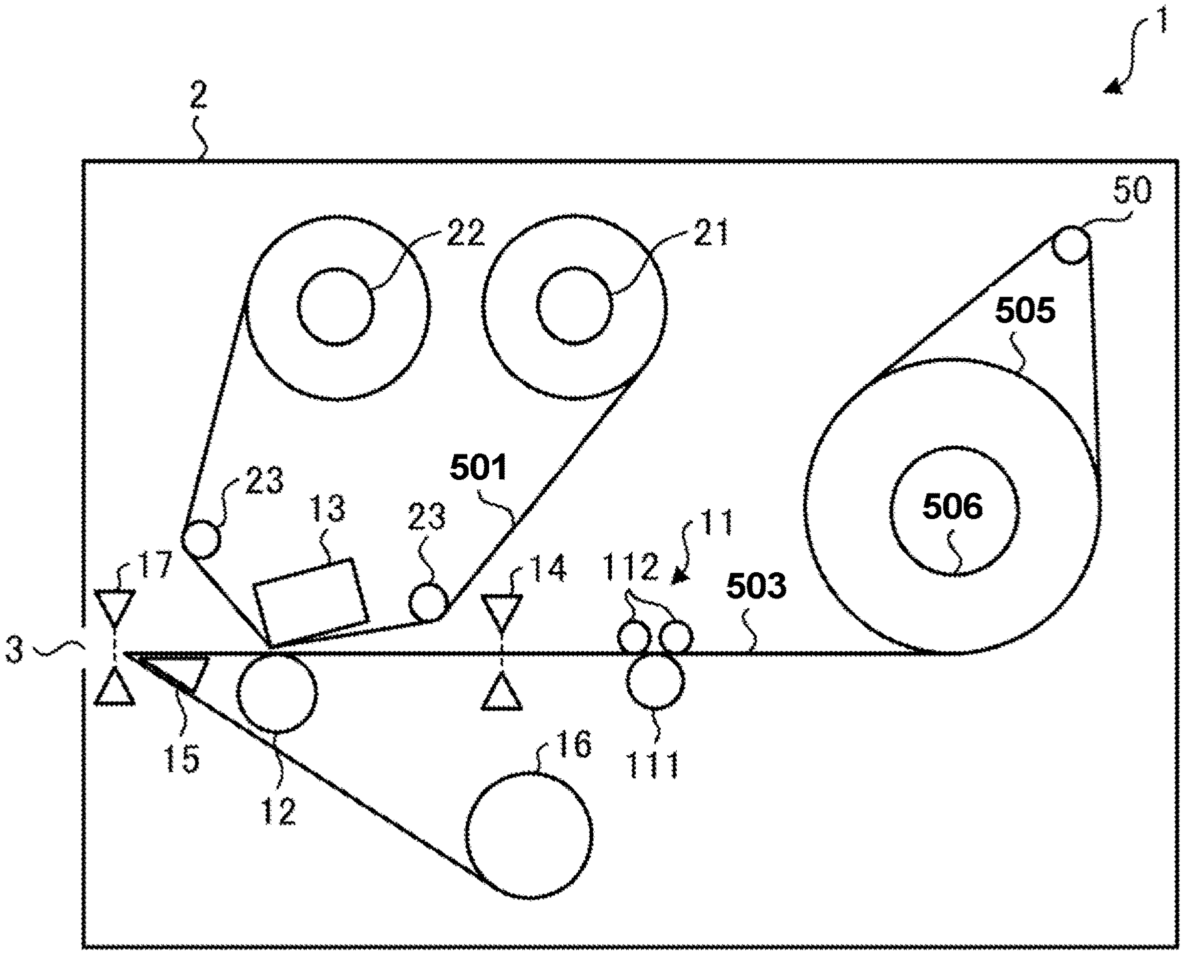
FIG. 1 is a schematic diagram showing a schematic configuration of a label printer according to an embodiment.

In accordance with an embodiment, a printer includes: a holder; a printing device; a near-end sensor; and a controller. The holder rotatably supports rolled paper to which labels are attached at predetermined intervals. The printing device prints on the labels attached to the rolled paper fed out from the holder. The near-end sensor outputs a detection signal where a diameter of the rolled paper rotatably supported by the holder is a predetermined value or less. The controller is configured to detect, on the basis of the detection signal output from the near-end sensor, a near-end state during an issuing operation of one label. The controller is further configured to determine, where the near-end state has been detected continuously for a predetermined number or more of labels, that a remaining amount of the rolled paper has been a predetermined amount or less.

Hereinafter, a printer according to an embodiment will be described in detail with reference to the drawings. In the drawings, the same reference symbols indicate the same or similar portions. Note that the embodiment is not limited by the following description. For example, although an example in which a label printer that prints on a label in an arbitrary operation mode is used as a printer will be described this embodiment, the embodiment is not limited thereto. The printer may be a printer that prints on rolled paper to which no label is attached as long as a conveying motor that conveys rolled paper performs a reverse operation as in a modification described below.

First, a schematic configuration of a label printer will be described. FIG. 1 is a schematic diagram showing a schematic configuration of a label printer according to an embodiment.

In a label printer 1, rolled paper 505 in which label paper 503 is wound in a roll is housed in a casing 2. The rolled paper 505 is rotatably supported by a holder 30 (see FIG. 3) described below. The rolled paper 505 includes a roll support 506 and the label paper 503 wound around the roll support 506. The label printer 1 prints on the labels while drawing out the label paper 503 from the roll support 506.

Figure 3:
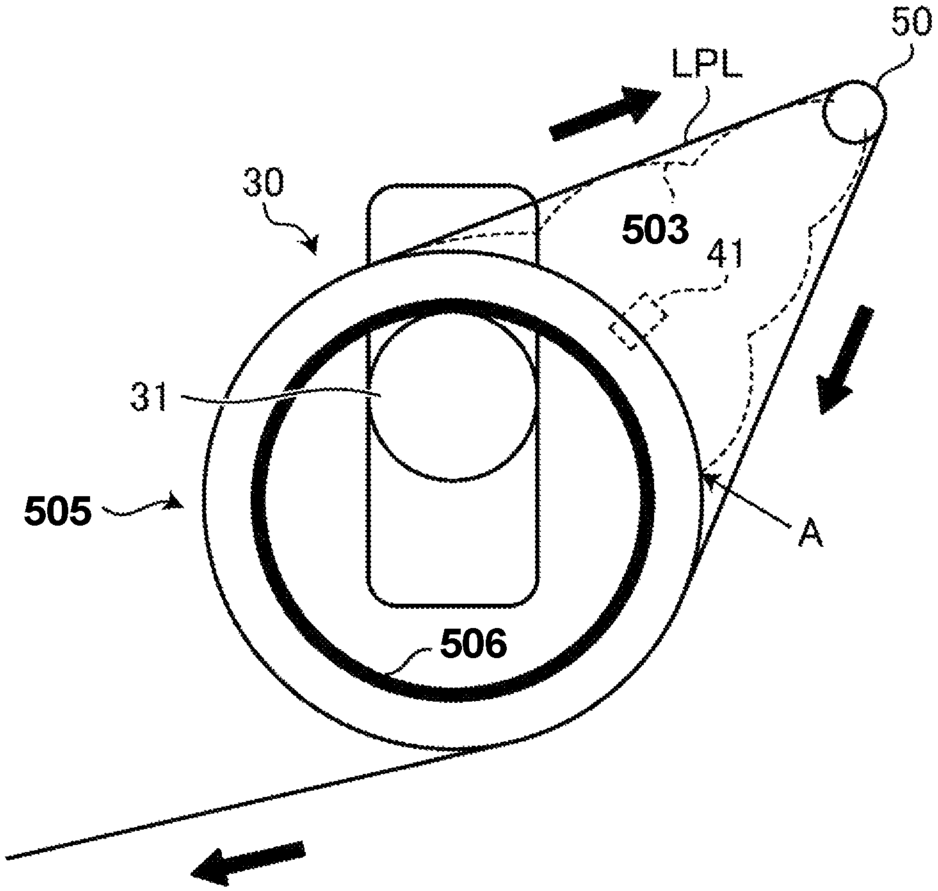
FIG. 3 is a diagram for describing movement of the rolled paper during an issuing operation of a label in the label printer according to the embodiment.

The label paper 503 drawn out from the roll support 506 is sequentially conveyed in the direction indicated by arrows shown in FIG. 3 via a damper roller 50. The damper roller 50 is attached to the casing 2 by a cantilever support structure in which one end thereof in the axial direction is attached to the casing 2, similarly to a support shaft 31 of the holder 30 (see FIG. 3). The damper roller 50 hangs the label paper 503 drawn out from the rolled paper 505 thereon to soften the impact applied to the rolled paper 505 at the moment when the label paper 503 lost its slack during the printing operation. Specifically, the damper roller 50 softens, when a conveying motor 40 is driven to convey the label paper 503 in the forward direction while the label paper 503 is loose, the impact applied to the rolled paper 505 at the moment when the label paper 503 lost its slack.

Figure 2:
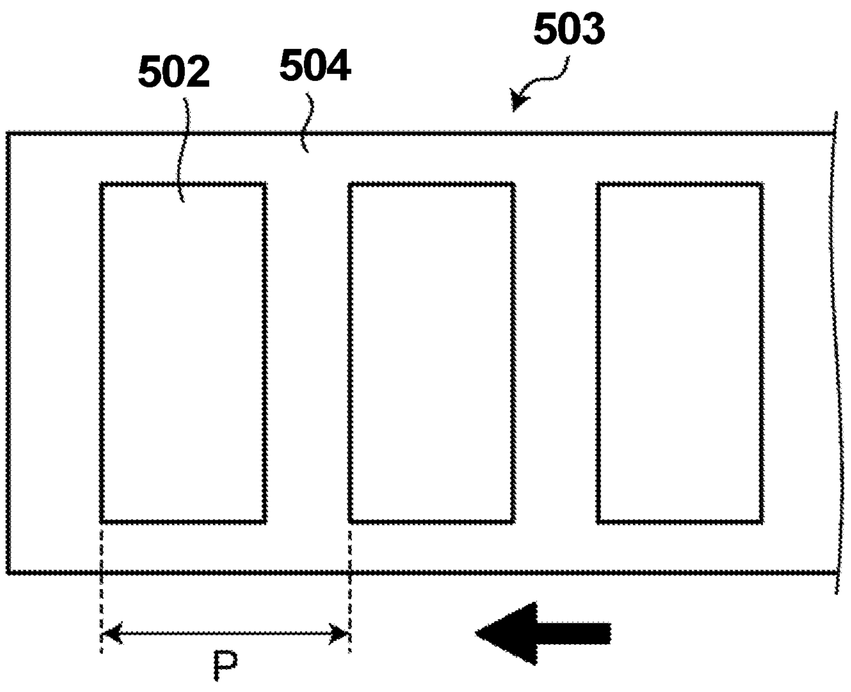
FIG. 2 is a diagram showing part of rolled paper according to the embodiment.

As shown in FIG. 2, the label paper 503 includes mounting paper 504 and a plurality of labels 502 attached to the mounting paper 504 at predetermined intervals. The plurality of labels 502 is attached to the mounting paper 504 at equal intervals with a predetermined label pitch "P". Note that the label pitch "P" is a distance between the tip of the label 502 in the conveying direction and the tip of the label 502 adjacent to the label 502 in the conveying direction. Note that the arrow in the figure indicates the conveying direction of the label paper 503, which is a conveying direction during forward rotation of the conveying motor 40 described below (see FIG. 5).

As shown in FIG. 1, the label printer 1 includes, inside the casing 2, a conveying roller 11, a platen roller 12, a thermal head 13, a label sensor 14, a peeling guide 15, a winding roller 16, a peeling sensor 17, and the damper roller 50. Further, the label printer 1 includes, inside the casing 2, a ribbon holding shaft 21, a ribbon winding shaft 22, and a guide shaft 23.

The conveying roller 11 includes a capstan roller 111 and two auxiliary rollers 112. The label paper 503 drawn out from the roll support 506 is inserted between the capstan roller 111 and the auxiliary rollers 112. The platen roller 12 is disposed at a position facing the thermal head 13. The label paper 503 is inserted between the platen roller 12 and the thermal head 13.

Figure 5:
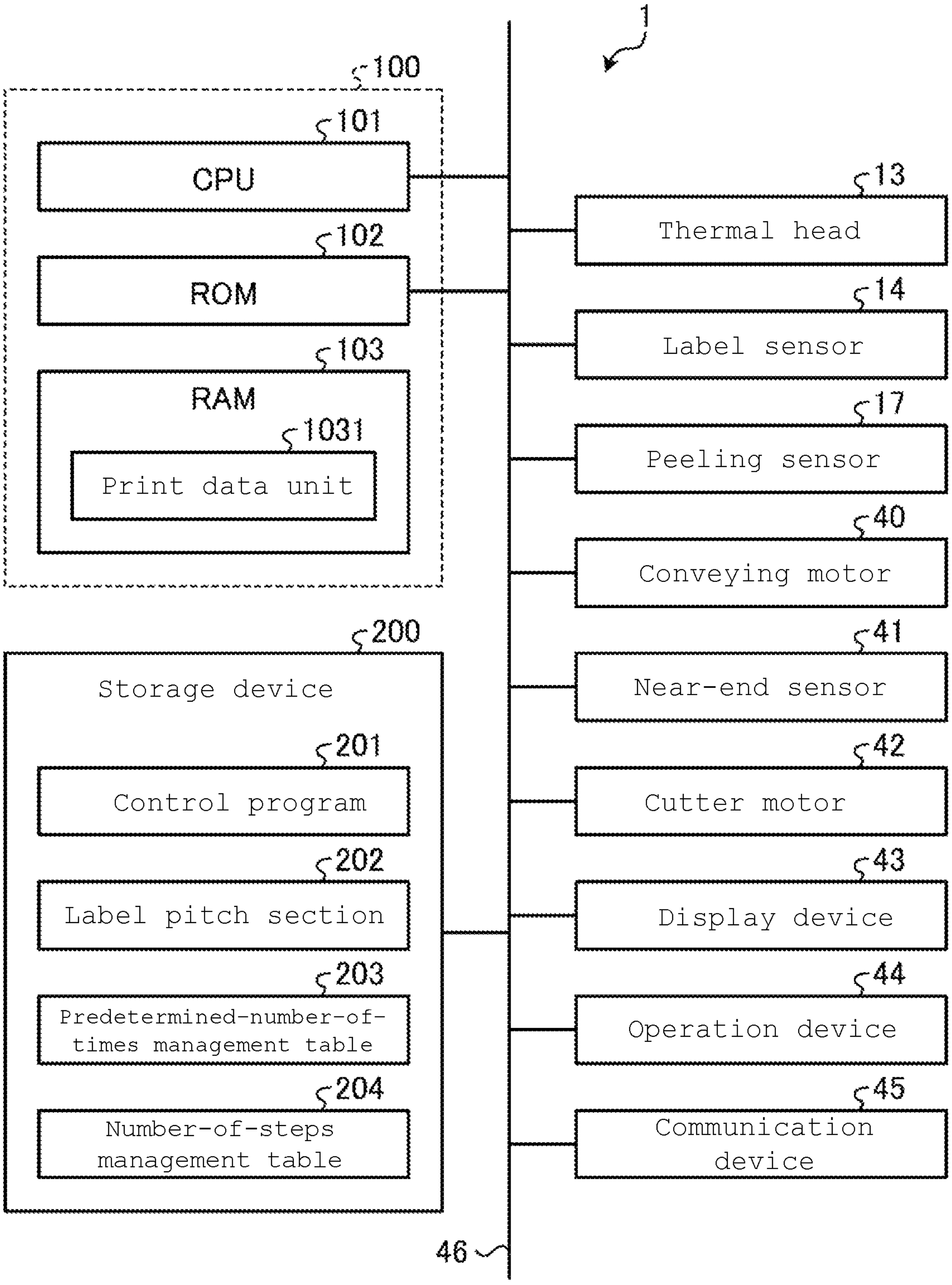
FIG. 5 is a block diagram showing a hardware configuration of the label printer according to the embodiment.

The capstan roller 111 and the platen roller 12 are driven to rotate by the conveying motor 40 (see FIG. 5). The conveying motor 40 is, for example, a forward and reverse rotatable stepping motor. The conveying motor 40 causes the capstan roller 111 and the platen roller 12 counterclockwise in the figure during forward rotation to convey the label paper 503 toward an outlet 3. Further, the conveying motor 40 causes the capstan roller 111 and the platen roller 12 to rotate clockwise in the figure during reverse rotation to convey the label paper 503 in the direction opposite to the direction of the outlet 3. In the following description, conveying the label paper 503 toward the outlet 3 will be referred to as "convey in the forward direction" and conveying the label paper 503 in the opposite direction will be referred to as "convey in the reverse direction" in some cases.

The label printer 1 has a continuous issuing mode, a cut issuing mode, and a peeling issuing mode. The continuous issuing mode is an operation mode in which a set number of labels 502 are continuously printed and the label paper 503 is discharged from the outlet 3. In the label paper 503 discharged from the outlet 3, the plurality of printed labels 502 has been attached to the mounting paper 504. In the continuous issuing mode, the conveying motor 40 rotates forward to convey the label paper 503 only in the forward direction.

The cut issuing mode is an operation mode in which the printed labels 502 are cut into each piece. Specifically, the cut issuing mode is a mode in which the mounting paper 504 located between the labels 502 is cut by a cutter (not shown) while the label paper 503 to which the printed labels 502 are attached is discharged from the outlet 3. As a result, the printed labels 502 are discharged one by one while being attached to the mounting paper 504. After the cutter cuts the mounting paper 504, the conveying motor 40 rotates in the reverse direction to convey the label paper 503 in the reverse direction and convey the label 502 to be printed next to the print start position.

The peeling issuing mode is an operation mode in which the label 502 is peeled from the mounting paper 504. Specifically, the peeling issuing mode is a mode in which most of the printed labels 502 are peeled from the mounting paper 504 and discharged from the outlet 3. When some labels 502 attached to the mounting paper 504 are taken out by a user, the label printer 1 prints on the next label 502. The conveying motor 40 rotates, when the peeled label 502 are taken out by the user, in the reverse direction to convey the label paper 503 in the reverse direction and convey the label 502 to be printed next to the print start position. Since the label paper 503 is conveyed in the reverse direction in the cut issuing mode and the peeling issuing mode, these modes are collectively referred to as a "reverse transfer mode" in some cases.

The thermal head 13 is an example of a printing device that prints on the label 502 of the rolled paper 505 fed out from the holder 30. That is, the thermal head 13 prints on the label 502 of the label paper 503 drawn out from the roll support 506. The thermal head 13 is also capable of printing on the rolled paper 505 to which the label 502 is not attached. The thermal head 13 has a structure in which a plurality of heating elements is aligned. The thermal head 13 heats the heating elements corresponding to a print pattern to print on the label 502 of the rolled paper 505 sandwiched between the platen roller 12 and the thermal head 13.

Specifically, an ink ribbon 501 is inserted between the platen roller 12 and the thermal head 13. The ink applied to the ink ribbon 501 is transferred to the label 502 of the rolled paper 505 by the heated thermal head 13.

The ink ribbon 501 is suspended between the ribbon holding shaft 21 and the ribbon winding shaft 22. The ribbon holding shaft 21 winds the unused ink ribbon 501 in a roll. The ribbon winding shaft 22 is a shaft for winding the ink ribbon 501. Further, the guide shaft 23 is a guide member for guiding the ink ribbon 501 suspended between the ribbon holding shaft 21 and the ribbon winding shaft 22 into a predetermined position. The ribbon winding shaft 22 is driven to rotate clockwise in the figure by a first drive motor (not shown) when printing on the label paper 503 and winds the ink ribbon 501.

Note that the thermal head 13 moves up and down by a moving mechanism (not shown) such as a solenoid. As a result, the label printer 1 is capable of switching between a state where the thermal head 13 is pressed against the platen roller 12 via the ink ribbon 501 and the rolled paper 505 and a non-pressure contact state where the thermal head 13 is away from the platen roller 12. The thermal head 13 is pressed against the platen roller 12 via the ink ribbon 501 when printing on the rolled paper 505. Further, the ribbon winding shaft 22 winds, during the printing, the ink ribbon 501 at a speed according to the conveying speed of the label paper 503 and stops the winding when the thermal head 13 enters the non-pressure contact state described above.

The label sensor 14 is provided on a conveying path of the label paper 503 between the conveying roller 11 and the platen roller 12. The label sensor 14 detects the tip portion of the label 502 in the conveying direction (hereinafter, referred to simply also as the "tip portion of the label 502") from the label paper 503. As a result, the label sensor 14 is capable of detecting the label pitch "P" (see FIG. 2). For example, the label sensor 14 can be realized by a transmissive sensor that includes a light-emitting element and a light-receiving device. The label sensor 14 detects the tip portion of the label 502 on the basis of the light reception level of the light-receiving device when conveying the label paper 503.

The label printer 1 calculates the position of the label 502 from the position of the tip portion of the label 502 detected by the label sensor 14 and conveys the label 502 to the print start position of the thermal head 13 in each operation mode.

The peeling guide 15 peels the label 502 printed in the peeling issuing mode from the mounting paper 504. The peeling guide 15 is formed in a V shape having two faces crossing each other at an acute angle. The peeling guide 15 bends the label paper 503 conveyed toward the outlet 3 to separate the mounting paper 504 and the label 502 from each other. While the mounting paper 504 from which the label 502 has been peeled is wound by the winding roller 16, the label 502 peeled from the mounting paper 504 is discharged (issued) from the outlet 3 provided in the casing 2.

The winding roller 16 holds one end of the rolled paper 505 and winds the mounting paper 504 from which the label 502 has been peeled, in the peeling issuing mode. The winding roller 16 is driven to rotate by a second drive motor (not shown). For example, the second drive motor causes, when printing on the label paper 503, the winding roller 16 to rotate counterclockwise in the figure to wind the mounting paper 504 from which the label has been peeled. The winding roller 16 does not hold the rolled paper 505 and is not used in the continuous issuing mode and the cut issuing mode.

The peeling sensor 17 is installed in the vicinity of the outlet 3 and detects the presence or absence of the labels 502 most of which have been peeled from the mounting paper 504 in the peeling issuing mode. The peeling sensor 17 can be realized by, for example, a transmissive sensor that includes a light-emitting element and a light-receiving device.

When the peeling sensor 17 detects the label 502, the label printer 1 temporarily stops the conveyance and printing of the label paper 503. When a user takes up the label 502 from the outlet 3, the peeling sensor 17 detects that the label 502 is not present. The label printer 1 restarts the conveyance and printing of the label paper 503 in the case where the peeling sensor 17 has detected that no label is present.

Specifically, the label printer 1 conveys, in the case of restating the printing, the label paper 503 in the reverse direction by a predetermined amount in order to return the next label following the peeled label to the print start position of the thermal head 13. The label printer 1 prints, when the conveyance in the reverse direction is completed, on the next label and issues the printed label from the outlet 3.

Next, the remaining amount detection of the rolled paper 505 will be described. FIG. 3 is a diagram for describing movement of the rolled paper 505 during an issuing operation of a label. In FIG. 3, the holder 30 that rotatably supports the rolled paper 505 includes the support shaft 31. The support shaft 31 is attached to the casing 2 by a cantilever support structure in which one end thereof in the axial direction is attached to the casing 2. The support shaft 31 is inserted through the roll support 506 of the rolled paper 505 to rotatably support the rolled paper 505. Note that although not shown, a guide that restrains the movement of the rolled paper 505 in the axial direction is provided in the other end of the support shaft 31.

The label printer 1 includes a near-end sensor 41. The near-end sensor 41 is provided at a position facing a side surface of the rolled paper 505 and detects a near-end state where the outer peripheral surface of the rolled paper 505 in the radial direction has been at a predetermined position. In other words, the near-end sensor 41 detects a near-end state where the diameter of the rolled paper 505 has been a predetermined amount or less by drawing out the label paper 503. The near-end sensor 41 can be realized by, for example, a reflective sensor that includes a light-emitting element and a light-receiving device.

In the support structure of the rolled paper 505 described above, the label paper 503 has a trajectory deviated from a virtual line "LPL" when being drawn out from the roll support 506 and passing through the damper roller 50. Specifically, the label paper 503 has a curl and has a trajectory indicated by a broken line in the figure due to the difference in strength of the curl between the portion to which the label 502 is attached and the portion to which no label is attached. In more detail, both end portions of the label 502 are recessed inward.

For this reason, at the point indicated by "A" in the figure, the rolled paper 505 supported by the support shaft 31 is pressed by the label paper 503 drawn out from the roll support 506 (portion located at the end portion of the label 502). The event that the rolled paper 505 is pressed by the label paper 503 drawn out from the roll support 506 occurs for each issuing operation of one label. The rolled paper 505 is pressed by the label paper 503 drawn out from the roll support 506 to move from a normal portion (hereinafter, referred to as "roll") in some cases. In this case, the near-end sensor 41 detects the near-end state even if the winding amount of the rolled paper 505 is not a predetermined amount or less.

The pressing force on the rolled paper 505 by the label paper 503 drawn out from the roll support 506 is not constant due to the degree of the curl of the label 502 and the like. For this reason, the rolled paper 505 does not roll in some cases while the remaining amount is the predetermined amount or more and the mass thereof is large, even if it is pressed by the label paper 503 drawn out.

Figure 4:
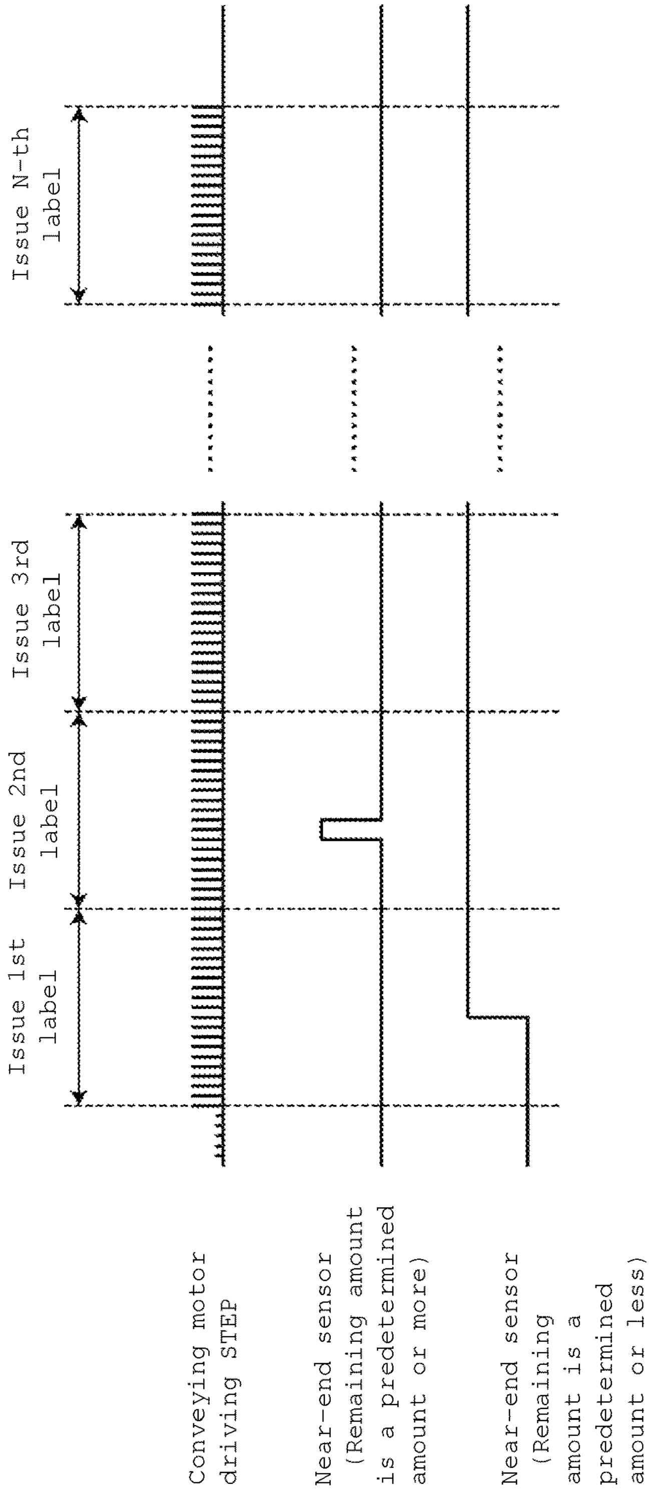
FIG. 4 is a timing chart showing an example of an output of a near-end sensor in the label printer according to the embodiment.

FIG. 4 is a timing chart showing an example of an output of the near-end sensor 41 in the continuous issuing mode. In the example shown in FIG. 4, in the case where the remaining amount of the rolled paper 505 is the predetermined amount or more, the pressing force applied to the rolled paper 505 during the issuing operation of a first label is small and the rolled paper 505 does not roll. For this reason, the near-end sensor 41 does not output the near-end state and does not output a detection signal (high level signal).

Note that in FIG. 4, an issuing operation of one label 502 (issuing operation of one label) is, for example, an operation of the label printer 1 from the time point when the label 502 reached the print start position to the time point when the next label 502 is conveyed to the print start position. In other words, the issuing operation of one label 502 is the operation of the thermal head 13, the conveying motor 40, and the like while the label paper 503 is conveyed by the amount of the label pitch "P" in the continuous issuing mode. In the following description, the period in the issuing operation of one label 502 will be referred to also as "one label issuing period".

In the example shown in FIG. 4, in the case where the remaining amount of the rolled paper 505 is the predetermined amount or more, the pressing force applied to the rolled paper 505 in the one label issuing period for the second label is large and the rolled paper 505 rolls. For this reason, the near-end sensor 41 detects the near-end state when the rolled paper 505 is pressed by the label paper 503 to roll and outputs a detection signal. Note that in the one label issuing period for the second label, after the rolled paper 505 is pressed by the label paper 503 at the point "A" (see FIG. 3), the rolled paper 505 returns to the normal portion, and thus, the near-end sensor 41 has returned to a state where it does not output a detection signal.

In this example, the near-end sensor 41 detects the near-end state only in the one label issuing period for the second label while N labels 502 are continuously issued. In other words, the near-end sensor 41 detects the near-end state in the one label issuing period for the second label although the remaining amount of the rolled paper 505 is the predetermined amount or more.

In the case where the remaining amount of the rolled paper 505 is the predetermined amount or less, the near-end sensor 41 detects the near-end state when the rolled paper 505 is at the normal portion and continues to output a detection signal. Even if the rolled paper 505 is pressed by the label paper 503 to roll in the continuous issuing mode, the near-end sensor 41 detects the near-end state and thus outputs a detection signal. In this regard, the label printer 1 according to this embodiment determines, in the case where the near-end sensor 41 has detected the near-end state continuously for a predetermined number or more of labels 502 in the continuous issuing mode, that the remaining amount of rolled paper has been low. Note that also in other operation modes, similarly, it is possible to prevent erroneous detection of the remaining amount detection of the rolled paper 505 due to that the rolled paper 505 is pressed by the label paper 503.

FIG. 5 is a block diagram showing a main hardware configuration of the label printer 1. The label printer 1 includes a controller 100, a storage device 200, the thermal head 13, the label sensor 14, the peeling sensor 17, the conveying motor 40, the near-end sensor 41, a cutter motor 42, a display device 43, an operation device 44, and a communication device 45. The controller 100, the storage device 200, the thermal head 13, the label sensor 14, the peeling sensor 17, the conveying motor 40, the near-end sensor 41, the cutter motor 42, the display device 43, the operation device 44, and the communication device 45 are connected to each other via a bus 46 or the like.

The controller 100 includes a central processing unit (CPU) 101, a read only memory (ROM) 102, and a random access memory (RAM)103. The CPU 101, the ROM 102, and the RAM 103 are connected to each other via the bus 46.

The CPU 101 controls the operation of the entire label printer 1. The CPU 101 is an example of a processor. The ROM 102 stores various programs such as the program to be used for driving the CPU 101, and various types of data. The RAM 103 is used as a work area of the CPU 101. The CPU 101 develops the various programs and the various types of data stored in the ROM 102 and the storage device 200. The CPU 101 operates in accordance with the control program that is stored in the ROM 102 and the storage device 200 and developed into the RAM 103, thereby executing various types of control processing of the label printer 1.

Further, the RAM 103 includes a print data section 1031. The print data section 1031 stores print data, the instructed number of copies to be printed, and the like received from an external apparatus such as a personal computer (hereinafter, referred to as a PC) 60 (see FIG. 8). Examples of the print data include character data and image data to be printed on the label 502. The instructed number of copies to be printed is the number of the labels 502 on which the print data is to be printed.

The storage device 200 includes a storage medium such as a hard disk drive (HDD) and a flash memory and retains the stored content even if the power is cut off. The storage device 200 stores a control program 201, a label pitch section 202, a predetermined-number-of-times management table 203, and a number-of-steps management table 204.

The control program 201 is a program for realizing a function of acquiring print data from an external apparatus such as the PC 60, a function of driving the thermal head 13 and the conveying motor 40 to print the print data on a medium (the label 502, the rolled paper 505, or the like), a function of detecting the label pitch "P" on the basis of the output of the label sensor 14, a function of performing the remaining amount detection on the basis of the output of the near-end sensor 41, and the like. The control program 201 includes various other control programs for operating the label printer 1.

The label pitch section 202 shown in FIG. 5 stores the label pitch of the rolled paper 505 to be used. The label pitch section 202 stores the label pitch detected by the label sensor 14. For example, the controller 100 of the label printer 1 conveys, when the rolled paper 505 is newly supported by the holder 30, the label paper 503 by a predetermined amount, detects the label pitch of the rolled paper 505 by the label sensor 14, and stores the detected label pitch in the label pitch section 202. The label pitch section 202 may store the label pitch input by operating the operation device 44 by a user.

The predetermined-number-of-times management table 203 is a table for storing the number of consecutive times (predetermined number of times) of the near-end state to be used for determining the remaining amount detection in accordance with the label pitch. The predetermined-number-of-times management table 203 can be arbitrarily set by a user. FIG. 6 is a diagram showing a data configuration of the predetermined-number-of-times management table 203. The predetermined-number-of-times management table 203 stores a label pitch range and a predetermined number of times in association with each other.

The label pitch range is a range of the label pitch of the rolled paper 505 to be used. In this embodiment, as the label pitch range, three ranges of 50 mm or less, larger than 50 mm and 100 mm or less, larger than 100 mm are set.

The predetermined number of times is the number of consecutive times of the near-end state to be used for determining the remaining amount detection. In other words, the label printer 1 determines, in the case where the near-end state has been detected a predetermined number of times continuously in one label issuing period, that the remaining amount detection has been performed, i.e., the remaining amount of the rolled paper 505 has been detected as a predetermined amount or less. By changing the predetermined number of times depending on the range of the label pitch, it is possible to prevent the determination of remaining amount detection from taking more time than necessary in the case where the rolled paper 505 having the long label pitch "P" is used.

The number-of-steps management table 204 is a table in which the number of steps of the conveying motor 40 necessary in one label issuing period is set for each label pitch. FIG. 7 is a table showing a data configuration of the number-of-steps management table 204. The number-of-steps management table 204 stores the label pitch and the number of steps for one label in association with each other.

The label pitch "P" is the label pitch of the rolled paper 505 to be used. The label pitch to be registered in the number-of-steps management table 204 may be registered in advance when the label printer 1 is shipped, or data stored in the label pitch section 202 may be used. Alternatively, the label pitch to be registered in the number-of-steps management table 204 may be input from the operation device 44 when a user uses the rolled paper 505.

The number of steps for one label is the number of steps for driving the conveying motor 40 in one label issuing period. The number of steps for one label to be registered in the number-of-steps management table 204 may be registered in advance when the label printer 1 is shipped or may be calculated by the controller 100 when the label pitch is registered. In this case, since the conveying distance of the conveying motor 40 for one step is determined, the controller 100 is capable of calculating the number of steps for one label corresponding to the label pitch.

With reference to FIG. 5 again, the hardware configuration of the label printer 1 will be described. The thermal head 13, the label sensor 14, the peeling sensor 17, the conveying motor 40, and the near-end sensor 41 are as described above.

The cutter motor 42 drives a cutter (not shown) that cuts the label paper 503 discharged from the outlet 3. Specifically, the cutter motor 42 drives, in the cut issuing mode, the cutter while the label paper 503 to which the printed labels 502 have been attached is discharged from the outlet 3. As a result, the printed labels 502 are discharged one by one while being attached to the mounting paper 504.

The display device 43 includes, for example, a liquid crystal panel and is provided on the outer surface of the casing 2. The display device 43 displays various types of information. For example, the display device 43 displays, in each operation mode, the instructed number of copies to be printed and the number of prints of the label 502 stored in the print data section 1031. Further, the display device 43 displays, when the remaining amount detection is performed, information indicating that the remaining amount of the rolled paper 505 is a predetermined amount or less, in each operation mode. The display device 43 is an example of a notification device that notifies that the remaining amount of the rolled paper 505 is a predetermined amount or less. Note that the notification device may include a speaker for audio output.

The operation device 44 includes, for example, a touch panel provided on the surface of the display device 43. The operation device 44 is operated by a user of the label printer 1 to input various types of information to the controller 100. For example, the operation device 44 inputs information for instructing the start of printing, information for setting an operation mode, or the like to the controller 100.

The communication device 45 is an interface for communicating with an external apparatus such as the PC 60. The controller 100 is connected to the external apparatus via the communication device 45 and thus is capable of transmitting/receiving information (data) to/from the external apparatus.

Figure 8:
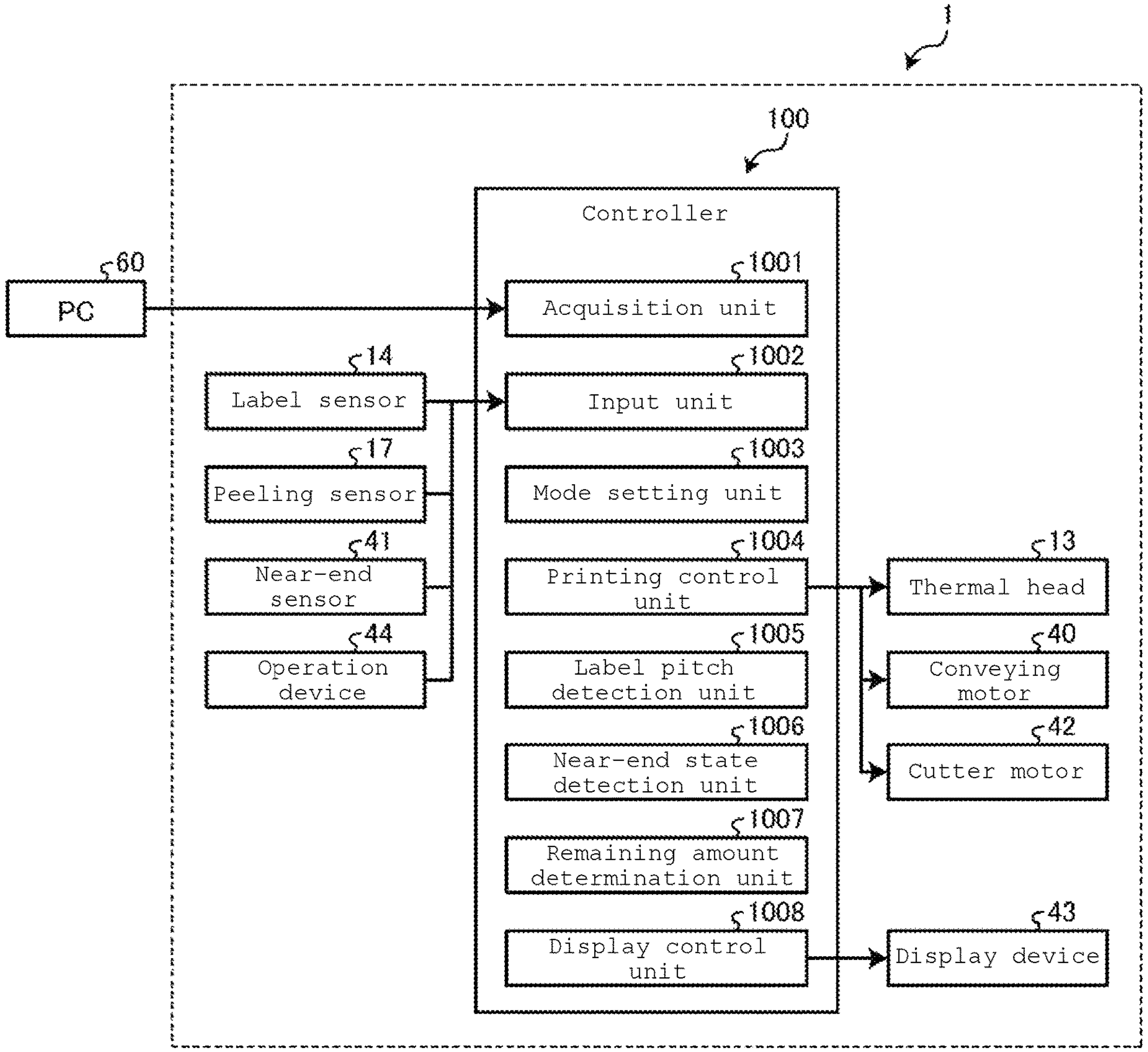
FIG. 8 is a block diagram showing a functional configuration of a control unit of the label printer according to the embodiment.

Next, a functional configuration of the label printer 1 will be described. FIG. 8 is a block diagram showing a main functional configuration of the label printer 1. When the CPU 101 operates in accordance with the control program stored in the ROM 102 and the storage device 200, the controller 100 functions as an acquisition unit 1001, an input unit 1002, a mode setting unit 1003, a printing control unit 1004, a label pitch detection unit 1005, a near-end state detection unit 1006, a remaining amount determination unit 1007, and a display control unit 1008. Note that these functions may be realized by hardware such as a dedicated circuit.

The acquisition unit 1001 acquires print data. Specifically, the acquisition unit 1001 receives, from the PC 60, print data such as character data and image data to be printed on the label 502. Further, the acquisition unit 1001 receives, from the PC 60, the instructed number of copies to be printed, which is associated with the print data. The acquisition unit 1001 stores the acquired print data and the acquired instructed number of copies to be printed in the print data section 1031.

Various types of information are input to the input unit 1002 from the label sensor 14, the peeling sensor 17, the near-end sensor 41, and the operation device 44. For example, in each operation mode, position information of the label 502 to be conveyed is input to the input unit 1002 from the label sensor 14. The position information of the label 502 includes information indicating the positions of the front end portion and the rear end portion of the label 502 in the conveying direction. The controller 100 performs printing control in each operation mode on the basis of the position information of the label 502 input to the input unit 1002. Further, the controller 100 detects, when new rolled paper 505 is loaded into the holder 30, for example, the label pitch of the rolled paper 505 on the basis of the position information of the label 502 input to the input unit 1002.

In the peeling issuing mode, peeling information indicating whether or not the printed label 502 is located at the outlet 3 is input to the input unit 1002 from the peeling sensor 17. The controller 100 controls, on the basis of the peeling information input to the input unit 1002, the thermal head 13 and the conveying motor 40 to perform printing control in the peeling issuing mode.

In each operation mode, detection information indicating whether or not the rolled paper 505 has been detected is input to the input unit 1002 from the near-end sensor 41. Further, various types of information are input to the input unit 1002 from the operation device 44. For example, setting information for setting an operation mode is input to the input unit 1002 from the operation device 44.

The mode setting unit 1003 sets the operation mode of the label printer 1. Specifically, the mode setting unit 1003 sets, on the basis of the setting information input to the input unit 1002, an operation mode such as the continuous issuing mode, the cut issuing mode, and the peeling issuing mode as the operation mode of the label printer 1.

The printing control unit 1004 controls the thermal head 13, the conveying motor 40, the cutter motor 42, and the like in accordance with the operation mode set by the mode setting unit 1003 to print on the rolled paper 505.

Specifically, the printing control unit 1004 controls the thermal head 13, the conveying motor 40, and the like in the continuous issuing mode to continuously print the label 502 and discharge the label paper 503 from the outlet 3. Further, the printing control unit 1004 controls the thermal head 13, the conveying motor 40, the cutter motor 42, and the like in the cut issuing mode to cut the printed labels 502 into each piece and issue it. Further, the printing control unit 1004 controls the thermal head 13, the conveying motor 40, and the like in the peeling issuing mode to peel the printed label 502 from the mounting paper 504 and issue it.

The label pitch detection unit 1005 detects the label pitch "P" of the rolled paper 505. Specifically, the label pitch detection unit 1005 detects, on the basis of the position information of the label 502 input to the input unit 1002, an interval between one end in the conveying direction of the label 502 attached to the mounting paper 504 and one end in the conveying direction of the next label 502. The label pitch detection unit 1005 stores the detected label pitch in the label pitch section 202.

The near-end state detection unit 1006 detects the near-end state on the basis of the output of the near-end sensor 41. Specifically, the near-end state detection unit 1006 detects, when detection information indicating that the near-end sensor 41 does not detect the rolled paper 505, i.e., a high-level detection signal, is input to the input unit 1002, that the rolled paper 505 is in the near-end state.

The remaining amount determination unit 1007 determines, in the case where the near-end state detection unit 1006 detects the near-end state continuously for a predetermined number or more of labels 502 in an arbitrary operation mode, that the remaining amount of the rolled paper 505 is a predetermined amount or less. In the case where the near-end state has been detected a predetermined number of times continuously in one label issuing period in each operation mode, the remaining amount determination unit 1007 detects that the remaining amount of the rolled paper 505 is the predetermined amount or less. For example, in the case where the label pitch "P" of the rolled paper 505 is 50 mm or less, the remaining amount determination unit 1007 determines, when the output of the near-end sensor 41 shown in FIG. 4 is a high level continuously from the issuing of a first label to the issuing of a sixth label, that the remaining amount of the rolled paper 505 is the predetermined amount or less.

The display control unit 1008 displays various types of information on the display device 43. For example, the display control unit 1008 displays, in the case where the remaining amount determination unit 1007 has determined that the remaining amount of the rolled paper 505 is the predetermined amount or less, information indicating this fact on the display device 43.

Figure 9:
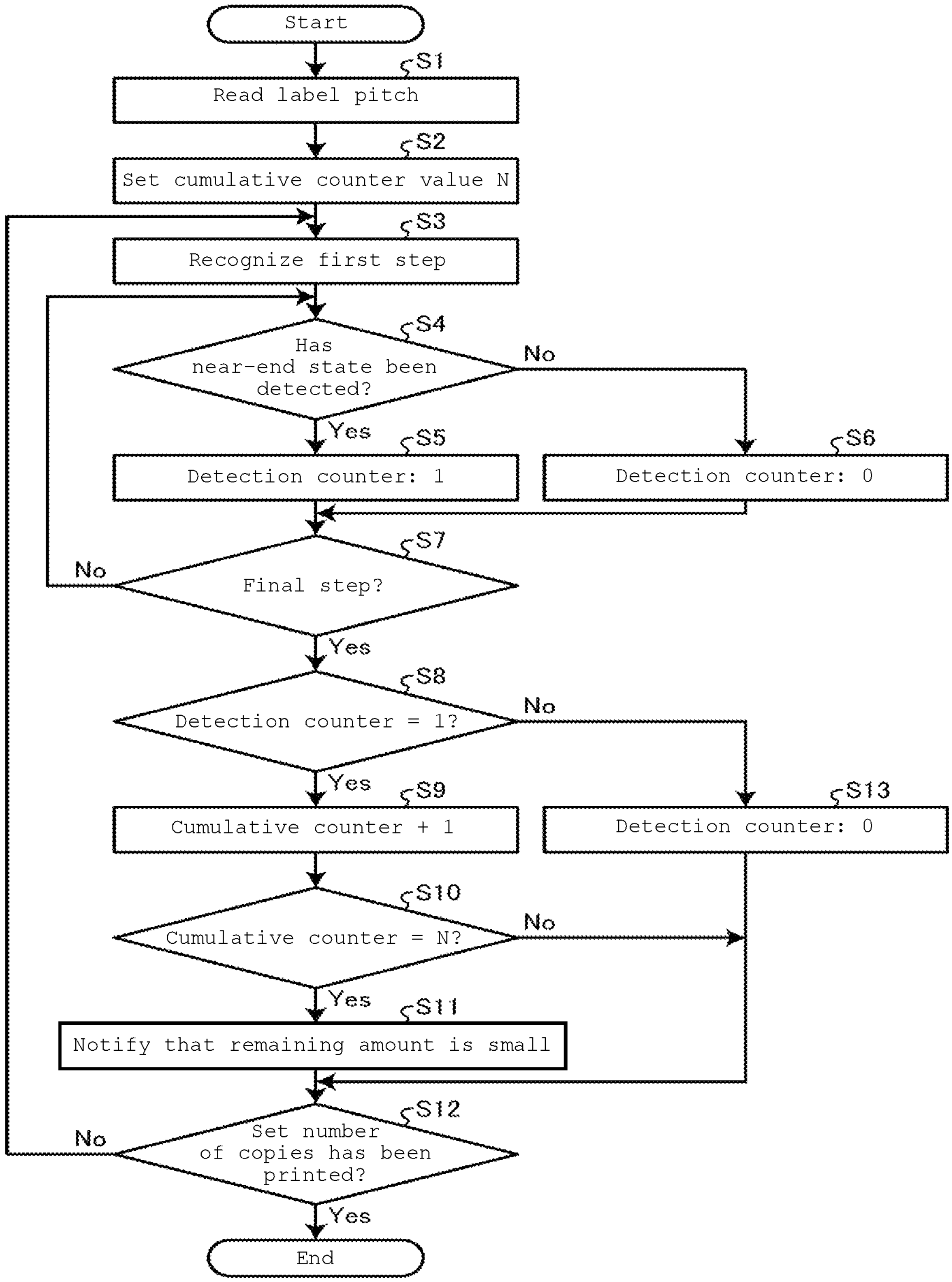
FIG. 9 is a flowchart showing remaining amount detection processing by the control unit of the label printer according to the embodiment.

Next, remaining amount detection processing executed by the controller 100 of the label printer 1 will be described. FIG. 9 is a flowchart showing the remaining amount detection processing by the controller 100 of the label printer 1. Note that the label pitch "P" of the rolled paper 505 has been stored in the label pitch section 202 before the remaining amount detection processing is executed. Further, the remaining amount detection processing is executed during an issuing operation in an arbitrary operation mode.

In Step S1, the controller 100 reads the label pitch of the rolled paper 505 from the label pitch section 202. Subsequently, in Step S2, the controller 100 refers to the predetermined-number-of-times management table 203 (see FIG. 6) to set the predetermined number of times corresponding to the read label pitch as a cumulative counter value N. For example, in the case where the label pitch read from the label pitch section 202 is 50 mm or less, the cumulative counter value N is set to six. Similarly, in the case where the read label pitch is larger than 50 mm and 100 mm or less, the cumulative counter value N is set to four. In the case where the read label pitch is larger than 100 mm, the cumulative counter value N is set to two.

Subsequently, in Step S3, the controller 100 serves as the printing control unit 1004 to recognize the first step of the drive signal of the conveying motor 40 in one label issuing period. In Step S4, the controller 100 serves as the remaining amount determination unit 1007 and the near-end state detection unit 1006 to determine, on the basis of the output of the near-end sensor 41, whether or not the near-end state has been detected. In other words, the controller 100 serves as the remaining amount determination unit 1007 to determine whether or not detection information indicating that the rolled paper 505 is not detected has been input to the input unit 1002 from the near-end sensor 41.

In the case where the controller 100 (near-end state detection unit 1006) has detected the near-end state (Yes in Step S4), the processing of the controller 100 proceeds to Step S5. In Step S5, the controller 100 sets the detection counter to "1". In the case where the controller 100 (near-end state detection unit 1006) has not detected the near-end state (No in Step S4), the processing of the controller 100 proceeds to Step S6. In Step S6, the controller 100 sets the detection counter to "0". For example, the controller 100 stores the detection counter value set in the RAM 103.

Subsequently, in Step S7, the controller 100 determines whether or not the drive signal in the final step of one label issuing period has been output. In the case where the drive signal in the final step of one label issuing period has not been output (No in Step S7), the processing of the controller 100 returns to Step S4. As a result, the near-end state detection unit 1006 of the controller 100 is capable of detecting that the near-end state has been reached at arbitrary timing in one label issuing period.

In the case where the drive signal in the final step of one label issuing period has been output (Yes in Step S7), the processing of the controller 100 proceeds to Step S8. In Step S8, the controller 100 determines whether or not the detection counter value is "1". In other words, the controller 100 determines whether or not the near-end state has been detected in one label issuing period. In the case where the detection counter value is "1" (Yes in Step S8), the processing of the controller 100 proceeds to Step S9. In Step S9, the controller 100 adds "1" to the value of the cumulative counter. The value of the cumulative counter is stored in, for example, the RAM 103.

Subsequently, in Step S10, the controller 100 serves as the remaining amount determination unit 1007 to determine whether or not the value of the cumulative counter has reached the set value "N". In the case where the value of the cumulative counter has reached "N" (Yes in Step S10), the controller 100 serves as the remaining amount determination unit 1007 to determine that the remaining amount of the rolled paper 505 has been a predetermined amount or less. The processing of the controller 100 proceeds to Step S11. In Step S11, the controller 100 serves as the display control unit 1008 displays, on the display device 43, information indicating that the remaining amount of the rolled paper 505 has been small, which is a predetermined amount or less. The display device 43 displays, for example, prompting replacement of the rolled paper 505 with new one.

Subsequently, in Step S12, the controller 100 determines whether or not the labels 502 corresponding to the instructed number of copies to be printed included in the print data acquired by serving as the acquisition unit 1001 have been issued. In other words, the controller 100 determines whether or not an issuing operation for one label has been executed for the instructed number of copies to be printed. When the labels 502 corresponding to the instructed number of copies to be printed have been issued (Yes in Step S12), the controller 100 finishes the remaining amount detection processing. In the case where the labels 502 corresponding to the instructed number of copies to be printed have not been issued (No in Step S12), the processing of the controller 100 returns to Step S3. The controller 100 continues the remaining amount detection processing until the labels 502 corresponding to the instructed number of copies to be printed are issued.

Note that in the case where the value of the detection counter is not "1" in Step S8 (No in Step S8), the processing of the controller 100 proceeds to Step S13. In Step S13, the controller 100 sets the value of the cumulative counter to "0". The processing of the controller 100 proceeds to Step S12. Further, in the case where the value of the cumulative counter is not "N" in the processing of Step S10 (No in Step S10), the processing of the controller 100 skips Step S11 and proceeds to Step S12.

By the remaining amount detection processing described above, the label printer 1 is capable of preventing erroneous detection of the remaining amount detection of the rolled paper 505 due to that the rolled paper 505 is pressed by the label paper 503, without providing a structure for holding down the rolled paper 505, or the like.

Next, a modification of the remaining amount detection processing will be described. The modification prevents erroneous detection of the remaining amount detection of the rolled paper 505 due to the tension applied to the label paper 503 during an issuing operation of a label. For example, when conveying the label paper 503 or when cutting the label paper 503 by a cutter, tension is applied to the label paper 503, which causes the rolled paper 505 to roll in some cases. In the modification, erroneous detection of the remaining amount detection is prevented by performing the remaining amount detection while tension is not applied to the label paper 503 as much as possible.

Figure 10:
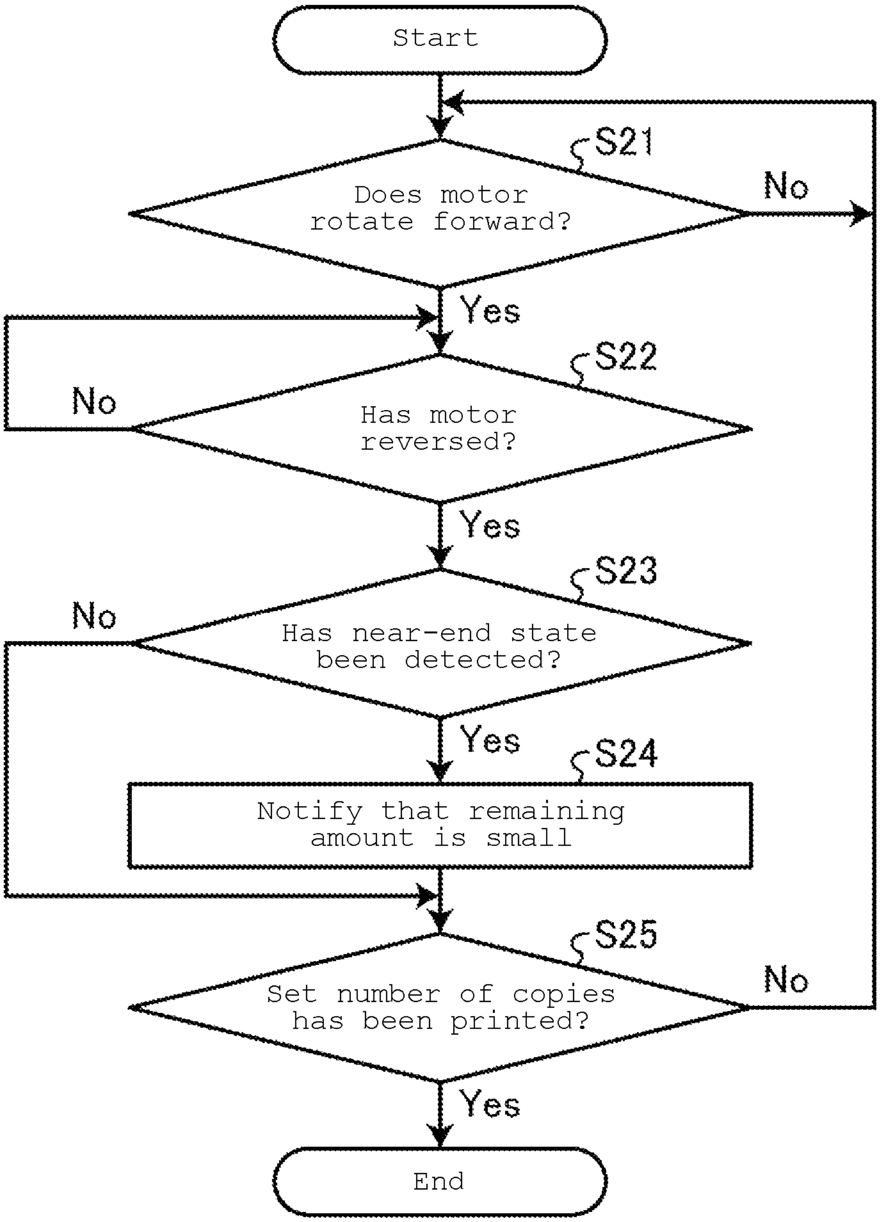
FIG. 10 is a flowchart showing remaining amount detection processing according to a modification of the control unit of the label printer according to the embodiment.

FIG. 10 is a flowchart showing a modification of the remaining amount detection processing by the controller 100 of the label printer 1. The remaining amount detection processing according to the modification is executed in the reverse transfer mode such as the cut issuing mode and the peeling issuing mode.

In Step S21 shown in FIG. 10, the controller 100 determines whether or not the conveying motor 40 rotates forward. The controller 100 performs the determination processing of Step S21 on the basis of whether or not the conveying motor 40 is caused to rotate forward by serving as the printing control unit 1004. In the case where the conveying motor 40 does not rotate forward (No in Step S21), the processing of the controller 100 returns to Step S21. In the case where the conveying motor 40 rotates forward (Yes in Step S21), the processing of the controller 100 proceeds to Step S22. In Step S22, the controller 100 determines whether or not the conveying motor 40 has reversed. In other words, the controller 100 determines whether or not the conveying motor 40 has rotated in the reverse direction. The controller 100 performs the determination processing of Step S22 on the basis of whether or not the printing control unit 1004 has caused the conveying motor 40 to rotate in the reverse direction.

In the case where the conveying motor 40 has not reversed (No in Step S22), the processing of the controller 100 returns to Step S22. In the case where the conveying motor 40 has reversed (Yes in Step S22), the processing of the controller 100 proceeds to Step S23. In Step S23, the controller 100 serves as the remaining amount determination unit 1007 and the near-end state detection unit 1006 to determine whether or not the near-end state has been detected. In other words, the controller 100 serves as the remaining amount determination unit 1007 and the input unit 1002 to determine whether or not detection information indicating that the rolled paper 505 is not detected has been input from the near-end sensor 41. The controller 100 serves as the remaining amount determination unit 1007 to determine whether or not it is the near-end state while the conveying motor 40 rotates in the reverse direction and the label paper 503 is loose, i.e., the label paper 503 does not pull the rolled paper 505 supported by the holder 30.

When the controller 100 serves as the near-end state detection unit 1006 to detect the near-end state (Yes in Step S23), the processing of the controller 100 proceeds to Step S24. In Step S24, the controller 100 serves as the display control unit 1008 to display, on the display device 43, information indicating that the remaining amount of the rolled paper 505 has been small, which is a predetermined amount or less.

Subsequently, in Step S25, the controller 100 determines whether or not the labels 502 corresponding to the instructed number of copies to be printed included in the print data acquired by serving as the acquisition unit 1001 have been issued. When the labels 502 corresponding to the instructed number of copies to be printed have been issued (Yes in Step S25), the controller 100 finishes the remaining amount detection processing. In the case where the labels 502 corresponding to the instructed number of copies to be printed have not been issued (No in Step S25), the processing of the controller 100 returns to Step S21. The controller 100 continues the remaining amount detection processing until the labels 502 corresponding to the instructed number of copies to be printed are issued.

Note that in the case where the controller 100 does not serve as the near-end state detection unit 1006 to detect the near-end state in the processing of Step S23 (No in Step S23), the processing of the controller 100 skips Step S24 and proceeds to Step S25.

By the remaining amount detection processing described above, the label printer 1 is capable of preventing erroneous detection of the remaining amount detection of the rolled paper 505 due to the tension applied to the label paper 503, without providing a structure for holding down the rolled paper 505, or the like.

As described above, the label printer 1 according to this embodiment includes the holder 30, the thermal head 13, the near-end sensor 41, and the controller 100. The holder 30 rotatably supports the rolled paper 505 that includes the mounting paper 504 to which the labels 502 are attached at predetermined intervals being wound. The thermal head 13 prints on the label 502 of the rolled paper 505 fed out from the holder 30. The near-end sensor 41 outputs a detection signal when the outer peripheral surface of the rolled paper 505 in the radial direction is at a predetermined position, the rolled paper 505 being rotatably supported by the holder 30. The controller 100 serves as the near-end state detection unit 1006 to detect, on the basis of the output of the near-end sensor 41, the near-end state during an issuing operation of one label. Further, the controller 100 serves as the remaining amount determination unit 1007 to determine, in the case where the near-end state detection unit 1006 has detected the near-end state continuously for a predetermined number or more of labels, that the remaining amount of the rolled paper 505 has been a predetermined amount or less.

As a result, the label printer 1 is capable of preventing erroneous detection of the remaining amount detection of the rolled paper 505 due to that the rolled paper 505 is pressed by the label paper 503, without particularly providing a structure for holding down the rolled paper 505.

Further, in the label printer 1 according to this embodiment, the controller 100 serves as the near-end state detection unit 1006 to determine, on the basis of the drive signal of the conveying motor 40 that conveys the rolled paper, that an issuing operation of one label is being performed.

As a result, the label printer 1 is capable of determining that an issuing operation of one label is being performed, with a simple configuration. Therefore, it is possible to simplify the configuration for preventing erroneous detection of the remaining amount detection of the rolled paper 505.

Further, in the label printer 1 according to this embodiment, the controller 100 serves as the label pitch detection unit 1005 to detect an interval between one end in the conveying direction of the label 502 attached to the mounting paper 504 and one end in the conveying direction of the next label 502. The controller 100 serves as the remaining amount determination unit 1007 to set the predetermined number of times described above in accordance with the detected interval.

As a result, the label printer 1 is capable of preventing the determination of remaining amount detection from taking more time than necessary in the case where the rolled paper 505 having the long label pitch "P" is used.

In addition, the label printer 1 according to this embodiment includes the holder 30, the thermal head 13, the near-end sensor 41, the conveying motor 40, and the controller 100. The holder 30 rotatably supports the rolled paper 505 wound in a roll. The thermal head 13 prints on the rolled paper 505 fed out from the holder 30. The near-end sensor 41 outputs a detection signal when the outer peripheral surface of the rolled paper 505 in the radial direction is at a predetermined position, the rolled paper 505 being rotatably supported by the holder 30. The conveying motor 40 rotates forward to convey the rolled paper 505 in the conveying direction and rotates in the reverse direction to convey the rolled paper 505 in the direction opposite to the conveying direction. The controller 100 serves as the near-end state detection unit 1006 to output a detection signal when the outer peripheral surface of the rolled paper 505 in the radial direction is at a predetermined position, the rolled paper 505 being rotatably supported by the holder 30. Further, the controller 100 serves as the remaining amount determination unit 1007 to determine, in the case where the near-end state detection unit 1006 has detected the near-end state while the conveying motor 40 does not rotate forward, that the remaining amount of the rolled paper 505 has been a predetermined amount or less.

As a result, the label printer 1 is capable of preventing erroneous detection of the remaining amount detection of the rolled paper 505 due to the tension applied to the label paper 503 in the reverse transfer mode, without particularly providing a structure for holding down the rolled paper 505, or the like.

Further, in the label printer 1 according to this embodiment, the controller 100 displays, on the basis of the determination result obtained by serving as the remaining amount determination unit 1007, information for informing that the remaining amount of the rolled paper 505 has been a predetermined amount or less on the display device 43.

As a result, the label printer 1 is capable of informing a user of that the remaining amount of the rolled paper 505 has been a predetermined amount or less.

Note that in the embodiment described above, the control program executed by the label printer 1 may be recorded on a computer-readable recording medium such as a CD-ROM and provided. Further, the control program executed by the label printer 1 according to the embodiment described above may be provided by storing the control program on a computer connected to a network such as the Internet and downloading it via the network. Further, the control program may be provided via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printer, comprising:

a holder that rotatably supports rolled paper in which label paper with a plurality of labels attached thereto at predetermined intervals is wound;

a printing device that prints on the labels attached to an unwound part of the label paper fed out from the holder;

a near-end sensor that outputs a detection signal where an outer peripheral surface of the rolled paper rotatably supported by the holder in the radial direction has reached a predetermined position; and a controller configured to detect, on a basis of the detection signal output from the near-end sensor, a near-end state of the rolled paper during an issuing operation of each of a set number of labels printed by the printing device, and determine, where the near-end state has been detected continuously for a predetermined number or more of labels out of the set number of labels, that a remaining wound amount of the label paper of the rolled paper is a predetermined amount or less.

2. The printer according to claim 1, wherein the near-end sensor is provided at a position facing a side surface of the rolled paper.

3. The printer according to claim 1, further comprising a conveying motor that conveys the label paper of the rolled paper, the controller being further configured to determine, on a basis of a drive signal of the conveying motor, that an issuing operation of one label is being performed.

4. The printer according to claim 1, further comprising a label sensor that detects a tip portion of a label in a conveying direction.

5. The printer according to claim 4, wherein the label sensor is provided on a conveying path through which the unwound part of the label paper of the rolled paper fed out from the holder is conveyed.

6. The printer according to claim 4, wherein the controller is further configured to detect, on a basis of detection information of the label sensor, an interval between an end of the label in the conveying direction and an end of a next label in the conveying direction.

7. The printer according to claim 4, wherein the controller is further configured to set the predetermined number in accordance with the detected interval, and determine, where the near-end state has been detected continuously for the predetermined number or more of labels, that the remaining wound amount of the rolled paper has been the predetermined amount or less.

8. A printer, comprising:

a holder that rotatably supports rolled paper in which label paper with a plurality of labels attached thereto at predetermined intervals is wound;

a printing device that prints on the labels attached to a part of the label paper fed out from the holder;

a near-end sensor that outputs a detection signal where an outer peripheral surface of the rolled paper rotatably supported by the holder in the radial direction has reached a predetermined position;

a conveying motor that, during an issuing operation, rotates forward to feed out the part of the label paper from the holder and convey the part of the label paper in a conveying direction and rotates in a reverse direction to convey the part of the label paper in a direction opposite to the conveying direction for printing of subsequent labels, a tension not being applied to the part of the label paper while the conveying motor does not rotate in the forward direction; and a controller configured to detect, on a basis of the detection signal output from the near-end sensor, a near-end state of the rolled paper during the issuing operation, and determine, where the near-end state has been detected while the conveying motor does not rotate forward, that the remaining wound amount of the label paper of the rolled paper is a predetermined amount or less.

9. The printer according to claim 8, further comprising a notification device, the controller being further configured to notify, on a basis of a result of the determination, that the remaining wound amount of the rolled paper is the predetermined amount or less via the notification device.

* * * * *